(12) United States Patent
Pearson et al.

(10) Patent No.: US 11,157,200 B2
(45) Date of Patent: Oct. 26, 2021

(54) COMMUNICATING OVER PORTIONS OF A COMMUNICATION MEDIUM

(71) Applicant: Hewlett-Packard Development Company, L.P., Houston, TX (US)

(72) Inventors: Roger A. Pearson, Fort Collins, CO (US); Byron A. Alcorn, Fort Collins, CO (US); Shane Ward, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 15/520,242

(22) PCT Filed: Oct. 29, 2014

(86) PCT No.: PCT/US2014/062791
§ 371 (c)(1),
(2) Date: Apr. 19, 2017

(87) PCT Pub. No.: WO2016/068893
PCT Pub. Date: May 6, 2016

(65) Prior Publication Data
US 2017/0308325 A1 Oct. 26, 2017

(51) Int. Cl.
*G06F 3/06* (2006.01)

(52) U.S. Cl.
CPC .......... *G06F 3/0658* (2013.01); *G06F 3/061* (2013.01); *G06F 3/0604* (2013.01); *G06F 3/0613* (2013.01); *G06F 3/0619* (2013.01); *G06F 3/0631* (2013.01); *G06F 3/0659* (2013.01); *G06F 3/0688* (2013.01)

(58) Field of Classification Search
CPC ...... G06F 3/0604; G06F 3/0658; G06F 3/061; G06F 3/0613; G06F 3/0639; G06F 3/0631; G06F 3/0688; G06F 3/0659
USPC .......................................... 711/103
See application file for complete search history.

(56) References Cited

U.S. PATENT DOCUMENTS 5,936,953 A 8/1999 Simmons
6,594,724 B1 7/2003 Smith
(Continued)

FOREIGN PATENT DOCUMENTS

CN 101231879 A 7/2008
CN 101650639 2/2010
(Continued)

OTHER PUBLICATIONS

"Programmable PCI-Express Root Port Bifurcation", IP.com Prior Art Database Technical Disclosure IP.com No. IPCOM000236239D, Apr. 14, 2014.*
(Continued)

*Primary Examiner* — Pierre Miche Bataille
(74) *Attorney, Agent, or Firm* — Brooks Cameron & Huebsch PLLC

(57) ABSTRACT

An electronic card includes a support substrate, a plurality of storage devices on the support substrate, and a plurality of controllers on the support substrate to manage access of the corresponding plurality of storage devices, wherein the plurality of controllers and the plurality of storage devices are arranged to store data according to a Redundant Array of Independent Disks (RAID) mode.

14 Claims, 4 Drawing Sheets

(56) References Cited

U.S. PATENT DOCUMENTS

| | | | |
|---|---|---|---|
| 7,065,779 B1* | 6/2006 | Crocker | H04L 12/2801 |
| | | | 725/111 |
| 7,756,123 B1 | 7/2010 | Huang et al. | |
| 8,060,670 B2* | 11/2011 | Yu | G06F 13/1684 |
| | | | 710/10 |
| 8,438,324 B2* | 5/2013 | Cho | G06F 11/1441 |
| | | | 710/305 |
| 8,756,360 B1 | 6/2014 | Richard et al. | |
| 10,459,809 B2* | 10/2019 | Alameer | G11C 7/24 |
| 2002/0159188 A1 | 10/2002 | Dimitri et al. | |
| 2004/0242270 A1 | 12/2004 | Bhatt et al. | |
| 2005/0044230 A1* | 2/2005 | Venugopal | G06F 3/0605 |
| | | | 709/227 |
| 2007/0008328 A1* | 1/2007 | MacWilliams | G06F 12/0646 |
| | | | 345/530 |
| 2008/0005425 A1 | 1/2008 | Saito | |
| 2008/0082747 A1* | 4/2008 | Islam | G06F 11/201 |
| | | | 711/114 |
| 2009/0089482 A1* | 4/2009 | Traister | G06F 12/0246 |
| | | | 711/103 |
| 2011/0320690 A1* | 12/2011 | Petersen | G06F 3/0685 |
| | | | 711/103 |
| 2012/0159004 A1* | 6/2012 | Cleveland | G06F 11/2089 |
| | | | 710/8 |
| 2013/0007332 A1 | 1/2013 | Teh et al. | |
| 2013/0173957 A1 | 7/2013 | Paul et al. | |
| 2014/0129741 A1* | 5/2014 | Shahar | G06F 13/382 |
| | | | 710/33 |
| 2014/0281070 A1* | 9/2014 | Natu | G06F 12/06 |
| | | | 710/105 |
| 2014/0330999 A1* | 11/2014 | Glickman | G06F 13/1694 |
| | | | 710/306 |
| 2015/0074337 A1* | 3/2015 | Jo | G06F 12/0246 |
| | | | 711/103 |
| 2015/0134880 A1* | 5/2015 | Danilak | G06F 3/061 |
| 2015/0143018 A1* | 5/2015 | Kim | G06F 13/4022 |
| | | | 710/316 |
| 2015/0143027 A1* | 5/2015 | Luo | G06F 3/0655 |
| | | | 711/103 |
| 2015/0277935 A1* | 10/2015 | Desimone | G06F 9/4411 |
| | | | 710/313 |
| 2016/0092116 A1* | 3/2016 | Liu | G11C 5/025 |
| | | | 711/103 |
| 2016/0306723 A1* | 10/2016 | Lu | G06F 11/2094 |
| 2017/0004098 A1* | 1/2017 | Das Sharma | G06F 13/1663 |
| 2018/0024920 A1* | 1/2018 | Thomas | G06F 12/0246 |
| | | | 711/103 |

FOREIGN PATENT DOCUMENTS

| | | | |
|---|---|---|---|
| CN | 103729147 | 4/2014 | |
| CN | 103729148 | 4/2014 | |
| EP | 0820018 A2 * | 1/1998 | G06F 13/368 |
| EP | 1944697 A1 * | 7/2008 | G06F 13/1684 |
| TW | 200823746 | 6/2008 | |
| TW | 200947207 | 11/2009 | |
| TW | 200949713 | 12/2009 | |
| TW | M479541 | 6/2014 | |
| WO | WO-2013184923 A1 | 12/2013 | |

OTHER PUBLICATIONS

B. Rahnama, A. Sari and R. Makvandi, "Countering PCIe Gen. 3 data transfer rate imperfection using serial data interconnect," 2013 The International Conference on Technological Advances in Electrical, Electronics and Computer Engineering (TAEECE), Konya, 2013, pp. 579-582.*

B. Kai, Y. Qinghong, X. Xin, X. Hui, Z. Yumei and Y. Wei, "Research and Design of Solid State RAID Storage System," 2010 International Conference on Intelligent System Design and Engineering Application, 2010, pp. 143-145.*

Wikipedia, "M.2 (formerly known as the Next Generation Form Factor (NGFF)", (6 pages).

Ramish Zafar, "ASRock Takes M.2 to the Next Level—Shatters I/O Speed with Ultra M.2 PCIe Gen3×4," May 22, 2014, pp. 1-18, WCCF (Pvt) Ltd., Available at: <wccftech.com/asrock-shatters-m2-io-speed-ultra-m2-pcie-gen3x4/>.

* cited by examiner

COMMUNICATING OVER PORTIONS OF A COMMUNICATION MEDIUM

CROSS-REFERENCE TO RELATED APPLICATION

This application is a U.S. National Stage Application of and claims priority to International Patent Application No. PCT/US2014/062791, filed on Oct. 29, 2014, and entitled "COMMUNICATING OVER PORTIONS OF A COMMUNICATION MEDIUM."

BACKGROUND

A system, such as a computer or other type of electronic device, can include a port to which an electronic card can be connected. An electronic card that can be removably connected to the port of the system can be referred to as a peripheral card, an expansion card, and so forth. The electronic card can include certain components that provide functionality that is accessible to the system once the electronic card is connected to the port of the system.

BRIEF DESCRIPTION OF THE DRAWINGS

Some implementations are described with respect to the following figures.

DETAILED DESCRIPTION

A system (e.g. a computer, a storage server, a communication server, etc.) can include ports to which electronic cards (also referred to as peripheral cards, expansion cards, etc.) can be removably connected. Different types of electronic cards can be connected to different ports of the system. In some cases, multiple electronic cards of the same type can be connected to multiple ports of the system. For example, multiple storage cards can be connected to multiple respective ports of the system. A storage card can include a storage device (or multiple storage devices) and an associated storage controller that manages access of data on the storage device(s).

The connection of multiple storage cards to respective ports of the system allows for storage of data across the multiple storage cards using a Redundant Array of Independent Disks (RAID) mode. As an example, a RAID 0 mode stripes data across the multiple storage cards, where striping data can refer to segmenting contiguous data into multiple segments that can be stored in different storage cards. The multiple segments can be accessed in parallel from the multiple storage cards to improve throughput in data accesses.

As another example, a RAID 1 mode causes a mirror copy of data stored on a first storage card to also be stored on a second storage card. The mirror copy of data is a redundant copy of the data that can be accessed in case the original data stored on the first storage card is no longer accessible, such as due to a failure or fault of the first storage card, or due to corruption of the original data.

Connecting multiple storage cards to respective ports may not be efficient in some cases. Each storage card is associated with a cost, and thus connecting multiple storage cards to a system increases the overall cost associated with operating the system. Also, connecting multiple storage cards to multiple ports to provide a specific application (e.g. storage of data according to a RAID mode) may mean that a reduced number of ports of the system are available for connection to other electronic cards.

Figure 1:
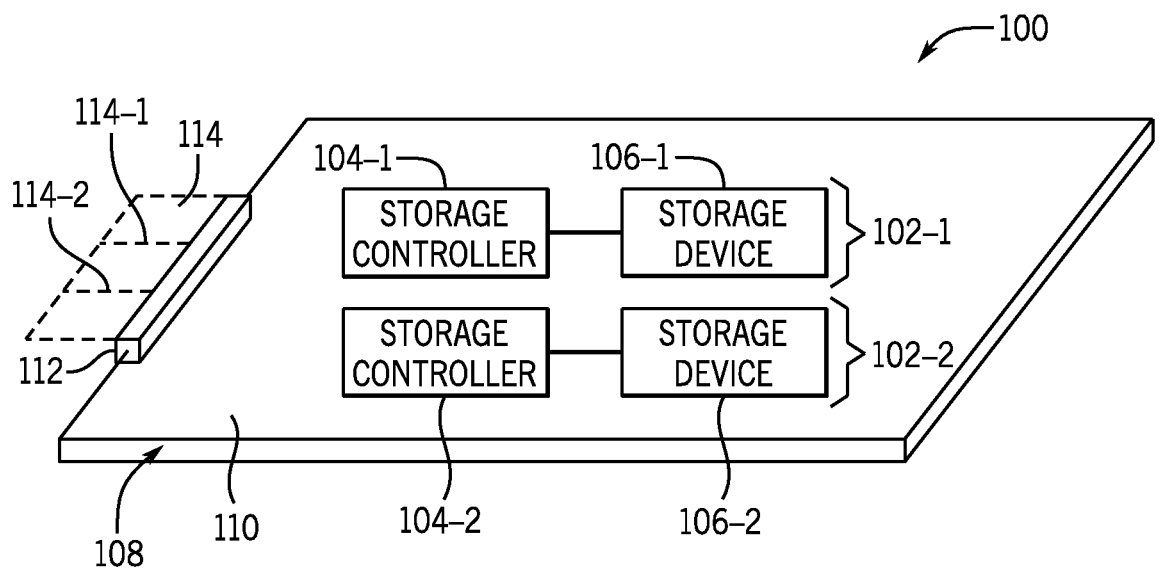
FIG. 1 is a block diagram of an example electronic card according to some implementations.

In accordance with some implementations, as shown in FIG. 1, an electronic card (and more specifically, a storage card) 100 is provided that includes multiple sets 102-1, 102-2 of storage controllers 104-1, 104-2 and associated storage devices 106-1, 106-2. The storage controllers 104-1 and 104-2 can be physically separate controllers, or alternatively, the storage controllers can be logically separate controllers that are part of the same physical device or package. For example, the logically separate controllers can be separate virtual controllers running on the same physical device or package.

The storage devices 106-1, 106-2 can include solid state storage devices (e.g. flash memory devices, dynamic random access memory devices, static random access memory devices, etc.). Alternatively, the storage devices 106-1, 106-2 can be disk-based storage devices.

Although FIG. 1 shows each storage controller 104-1 or 104-2 connected to one respective storage device 106-1 or 106-2, respectively, it is noted that a storage controller can be connected to multiple storage devices to manage access of data on the multiple storage devices.

A storage controller is able to receive a request (e.g. read request, write request, etc.) to access data in a respective storage device (or storage devices) to which the storage controller is connected. In response to the request, the storage controller performs the requested operation (e.g. read operation, write operation, etc.) by accessing (e.g. reading, writing, etc.) data of the storage device(s). For a read operation, the storage controller can return data read from the storage device(s) to the requester. For a write operation, the storage controller can write data into the storage device(s), and in some cases, can provide an acknowledgment of successful write to a requester.

The storage card 100 includes a support substrate 108 that has a support surface 110 on which the storage controllers 104-1, 104-2 and storage devices 106-1 and 106-2 are mounted. In some examples, electronic components (including storage controllers and/or storage devices) can also be mounted on a bottom support surface (opposite of the support surface 110) of the support substrate 108.

In some examples, the support substrate 108 can be a circuit board or other type of substrate to which the storage controllers 104-1, 104-2 and storage devices 106-1, 106-2 are connected. The support substrate 108 includes communication channels (e.g. electrically conductive traces, optical paths, etc.) for connecting input/output (I/O) elements (e.g. electrical pins, optical ferrules, etc.) of various components on the support substrate 108, including the storage controllers 104-1, 104-2, the storage devices 106-1, 106-2, a connector 112, and other components. Although just one connector 112 is shown in FIG. 1, it is noted that in other examples, the card 100 can have multiple connectors.

In the ensuing discussion, reference is made to electrical connection or electrical communication between various components. Note, however, that techniques or mechanisms according to some implementations can be applied to other forms of connections and communications, including optical connections and communications.

The connector 112 is electrically connected (over the electrically conductive traces of the support substrate 108) to the storage controllers 104-1 and 104-2. The connector 112 includes signal pins that communicate respective signals (data signals, address signals, control signals, etc.) over a communication medium 114 with a remote system (which can be referred to as a "host system" in the ensuing discussion). More generally, the host system can be referred to as a "requester device," which is a device that is able to access data on the storage card 100.

The connector 112 can also include power pins, including pin(s) to deliver a power supply voltage to the storage card 100, and ground and/or reference pin(s). A host system can refer to a system that is able to access the functionality of component(s) provided on one or multiple electronic cards connected to ports of the host system.

The connector 112 can be directly connected to a respective port connector of a port of the host system, in which case the communication medium 114 is made up of the signal pins of the connector 112 and the port connector. Alternatively, the connector 112 can be connected over a cable to the port connector of the host system, in which case the communication medium 114 is made up of the signal pins of the connector 112 and port connector and the cable.

The communication medium 114 can be split into multiple different portions 114-1 and 114-2 to allow the multiple storage controllers 104-1 and 104-2 in the storage card 100 to independently communicate over the respective portions 114-1 and 114-2 of the communication medium 114. By allowing the multiple storage controllers 104-1 and 104-2 to independently communicate over the respective portions of the communication medium 114, a single storage card (100) can be used to implement the storage of data according to a RAID mode. In some implementations, the storage controllers 104-1 and 104-2 are able to communicate concurrently over the communication medium portions 114-1 and 114-2.

Although just two sets 102-1 and 102-2 of storage controllers and storage devices are shown in FIG. 1, it is noted in other examples, more than two sets of storage controllers and storage devices can be included in the storage card 100. If there are more than two sets of storage controllers and storage devices, then the communication medium 114 can be divided into more than two portions to communicate with the respective storage controllers of the more than two sets.

Note that the plural portions 114-1, 114-2 of the communication medium 114 can be physically distinct portions, where at least certain communication channels of a first communication medium portion are physically distinct from at least certain communication channels of a second communication medium portion. In other implementations, the communication medium portions 114-1, 114-2 can be logically distinct portions, where they share the same communication channels, but a switch or other interface can be used to allow for the independent communication of the storage controllers 104-1, 104-2 over the logically distinct communication medium portions 114-1, 114-2.

In some implementations, the storage card 100 conforms to the M.2 standard, formerly referred to as the Next Generation Form Factor (NGFF) standard. The M.2 standard defines a form factor for an electronic card. A form factor of an electronic card can refer to the dimensions of the electronic card and other properties, such as locations of mounting structures (e.g. mounting holes, mounting notches, mounting pins, etc.), and other properties. In addition, the M.2 standard also defines the connector to be used with an electronic card, including the position of the connector, the number of pins on the connector, and the actual signal and power pins used on the connector.

According to the M.2 standard, the communication medium (e.g. 114) that is connected to the connector 112 operates according to a Peripheral Component Interconnect Express (PCIe) protocol. Thus, the communication medium 114 of FIG. 1 can be a PCIe bus. PCIe defines a high-speed serial computer expansion bus standard. In such examples, the connector 112 is a PCIe connector.

In other examples, the communication medium 114 can operate according to other protocols.

As noted above, the provision of multiple sets 102-1 and 102-2 of storage controllers and storage devices allows for data to be stored in the storage devices 106-1 and 106-2 according to a RAID mode. The storage card 100 can be configurable according to a number of different RAID modes. Examples of RAID modes include RAID 0 and RAID 1, as noted above, as well as other RAID modes.

The RAID 0 mode employs striping of data across the multiple storage devices 106-1, 106-2. Striping of data can refer to segmenting contiguous data into multiple segments that can be stored across the different storage devices 106-1 and 106-2. These multiple segments can be accessed in parallel through the respective storage controllers 104-1 and 104-2 and communication medium portions 114-1 and 114-2, to improve data throughput in the access of data on the storage card 100.

The RAID 1 mode involves creating a mirror copy of data stored on one of the storage devices (e.g. storage device 106-1)—the mirror copy of data can be stored on the other storage device (e.g. 106-2).

The RAID 10 mode is a combination of the RAID 0 and the RAID 1 mode. The RAID 10 mode performs both striping and mirroring of data on the storage devices 106-1 and 106-2.

In further examples, other RAID modes can also be implemented, such as RAID 5 and RAID 6. The RAID 5 mode produces parity information based on data. The parity information can be used for performing error detection and correction. The data and parity information is subjected to block-level striping across storage devices. To implement the RAID 5 mode, three or more sets of storage controllers and storage devices are provided in the storage card 100.

The RAID 6 mode produces double parity information (which provides fault tolerance for up to two failed storage devices). Block-level striping is performed on the data and the double parity information. The RAID 6 mode can be implemented with four or more sets of storage controllers and storage devices.

More generally, the storage card 100 is configurable to operate in one of several RAID modes, including those RAID modes that employ striping of data to improve data throughput, and those RAID modes that employ redundant information (such as the mirror copy of RAID 1 or the parity information of RAID 5 or 6).

Figure 2:
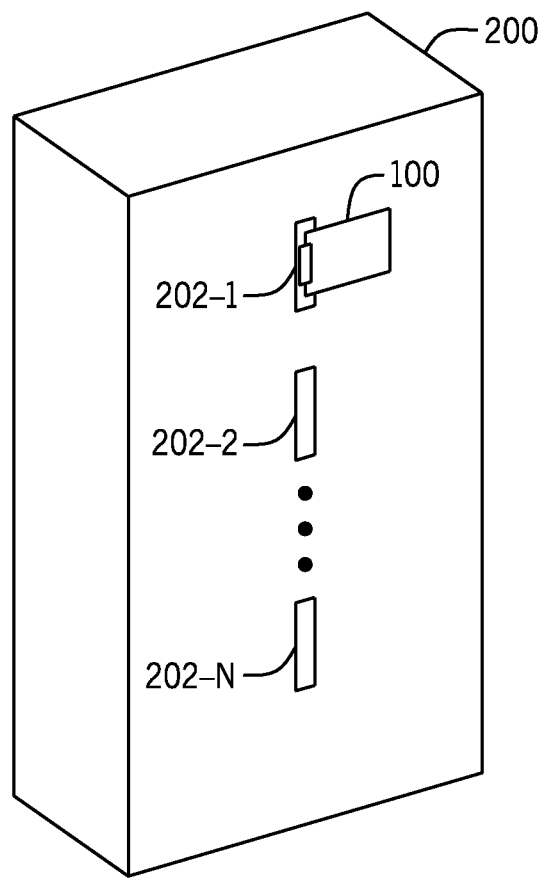
FIG. 2 is a block diagram of an example arrangement that includes a host system and an electronic card, in accordance with some implementations.

FIG. 2 is a schematic diagram that shows an example arrangement that includes the storage card 100 and a host system 200. The host system 200 includes a number of ports 200-1, 200-2, . . . , 202-N. In the example of FIG. 2, the storage card 100 is connected to a port connector in the port 200-1.

Figure 3:
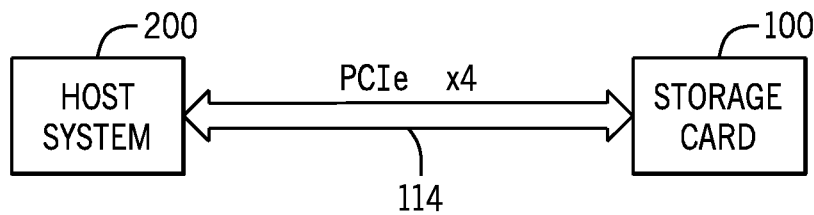
FIGS. 3-5 are schematic diagrams to illustrate dividing a communication medium into multiple portions to allow independent communications with storage controllers of a storage card, in accordance with some implementations.

In some examples, as shown in FIG. 3, the communication medium 114 between the host system 200 and the storage card 100 is a PCIe x4 link; in other words, the communication medium 114 includes four PCIe lanes split according to some implementations as discussed above. A PCIe lane includes two pairs of wires, with a first pair of wires to transmit data and a second pair of wires to receive data. In other examples, other arrangements of communication lanes can be employed. More generally, the PCIe link 114 can include multiple lanes that can be split into multiple portions.

Figure 4:
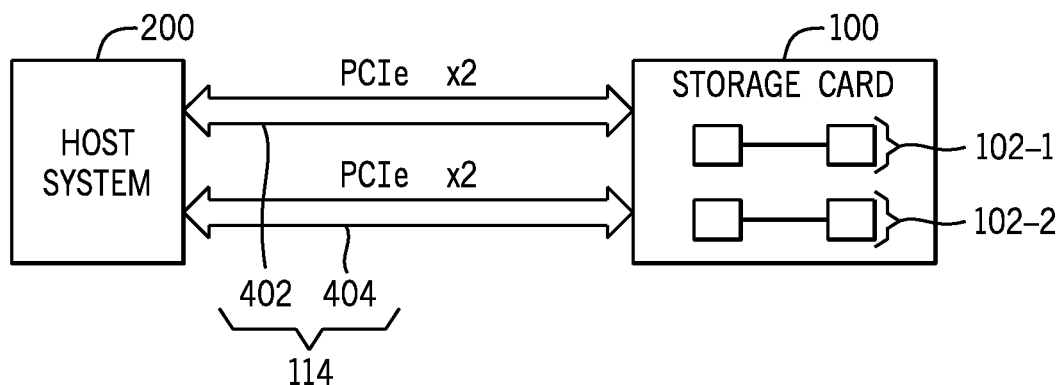

FIG. 4 shows an example where the PCIe x4 link has been split into two portions: a first PCIe x2 link 402, and a second PCIe x2 link 404. The first PCIe x2 link 402 (which includes two PCIe lanes) is connected to the first set 102-1 of storage controller and storage device in the storage card 100, while the second PCIe x2 link 404 (which includes two PCIe lanes) is connected to the second set 102-2 of storage controller and storage device.

Figure 5:
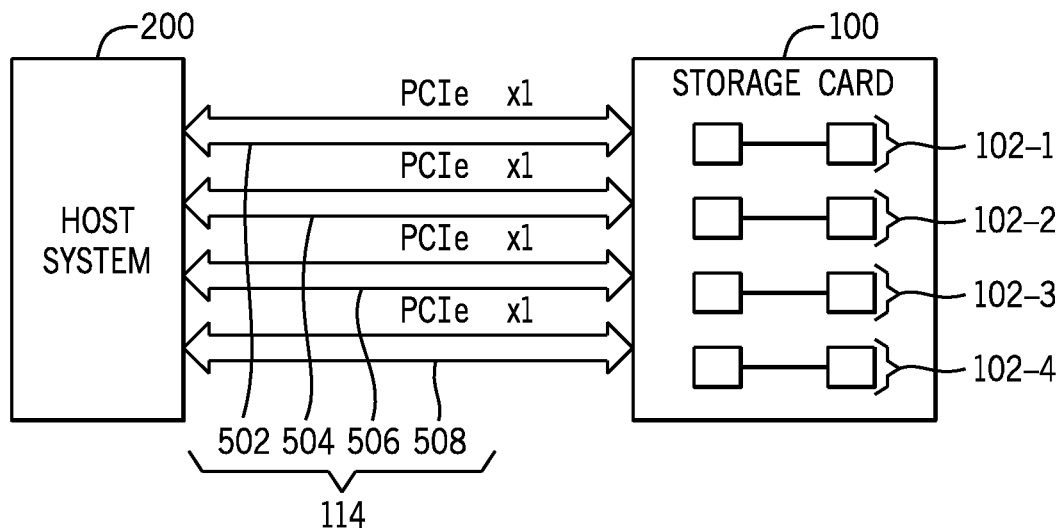

FIG. 5 shows another example arrangement, in which the storage card 100 includes four sets 102-1, 102-2, 102-3, 102-4 of storage controllers and storage devices. In this arrangement, the PCIe x4 link 114 is divided into four PCIe x1 links 502, 504, 506, and 508, which are respectively connected to the storage controllers of sets 102-1, 102-2, 102-3, and 102-4.

The arrangement of FIG. 4 can support either the RAID 0 or RAID 1 mode. The arrangement of FIG. 5 can support the RAID 0, RAID 1, RAID 10, RAID 5, or RAID 6 mode, or some combination of the foregoing.

In the foregoing discussion, reference is made to implementations where the storage card 100 is an M.2 card. In other implementations, the storage card 100 can conform to a PCIe standard, in which case the storage card 100 is a PCIe card. A PCIe card conforms to the form factor and other specifications provided by the PCIe standard. A PCIe card can include one of the following: an M.2 card, a Card Electromechanical (CEM) card (according to the PCIe Card Electromechanical Specification), a 2.5" (or other form factor) Serial Advanced Technology Attachment (SATA) Express card according to the SATA Express standard, and a 2.5" (or other form factor) SFF-8639 card according to the Small Form Factor (SFF) 8639 Form Factor Specification.

Figure 6:
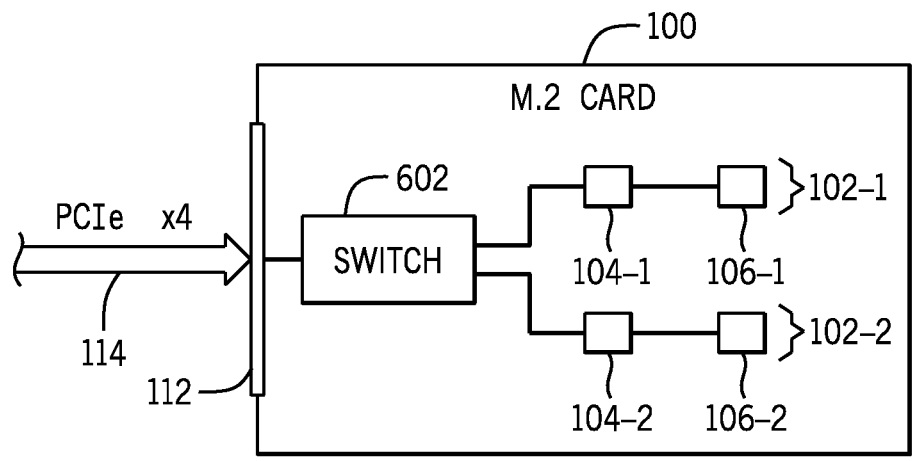
FIG. 6 is a schematic diagram of an example storage card according to alternative implementations.

In implementations where the storage card 100 is an M.2 card, a switch 602 can also be provided on the storage card 100, as shown in FIG. 6. In other examples, the switch 602 can be used in an electronic card of another form factor. The switch 602 is provided between the connector 112 and the multiple sets 102-1, 102-2 of storage controllers and storage devices. In some examples, each set 102-1 or 102-2 can be in the form of a device (e.g. a 2.5" form factor device), and the switch 602 can interconnect the communication medium 114 (in the form of a cable or some other type of medium) to the devices. Other arrangements can be used in other examples.

The switch 602 can be a PCIe switch, which is able to selectively connect the storage controller of one of the sets 102-1 and 102-2 to the communication medium 114 (e.g. a PCIe x4 link). Using the switch 602, the full bandwidth of the communication medium 114 can be provided for each storage controller 104-1 or 104-2. In other words, the communication medium 114 does not have to be physically separated into physically distinct portions, such as according to FIGS. 4, and 5. Rather, each storage controller 104-1 or 104-2 is able to communicate using the full bandwidth of the communication medium 114 (e.g. the full bandwidth of the PCIe x4 link) by communicating through the switch 602.

Effectively, the switch 602 divides the communication medium 114 into logically distinct communication medium portions that allow the storage controllers 104-1 and 104-2 to independently communicate over the respective logically distinct communication medium portions. In some examples, the full bandwidth of the communication medium 114 coupled to one side of the switch 602 does not have to equal the aggregate bandwidth of the links coupled to the other side of the switch 602.

Note that for implementations where the communication medium 114 is divided into physically distinct portions, each communication medium portion has a bandwidth that is less than or equal to the full bandwidth of the communication medium 114.

Although the foregoing describes examples that employ a PCIe x4 link, it is noted that in other examples, links of other widths can be employed, such as x8, x16, and so forth.

Figure 7:
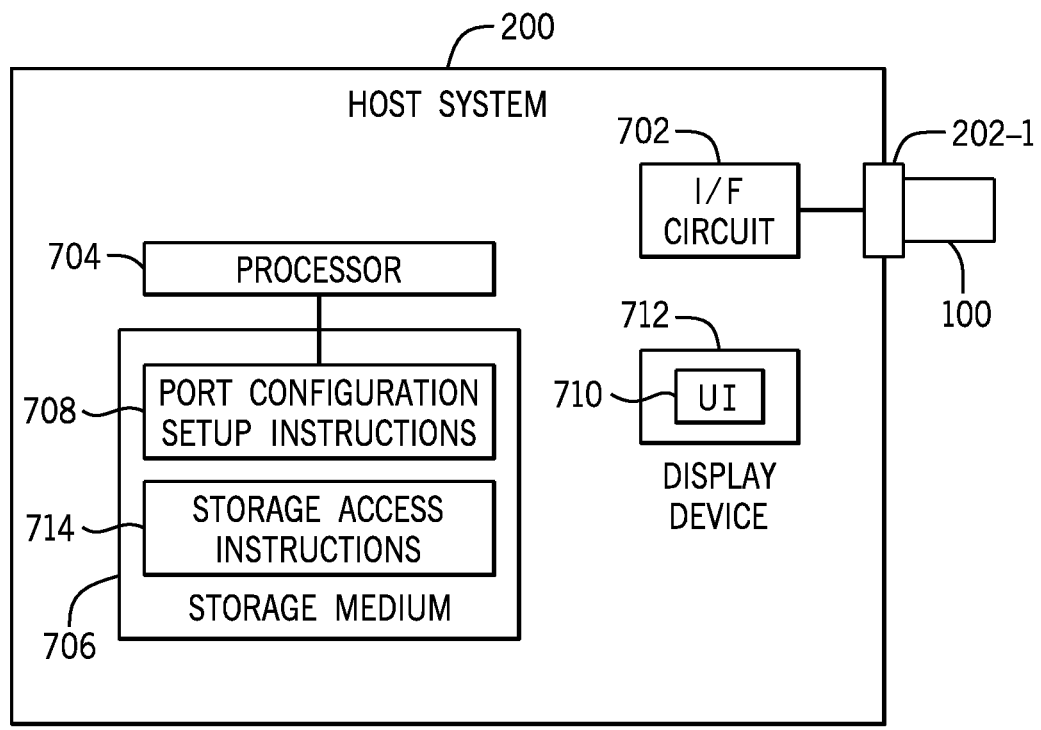
FIG. 7 is a schematic diagram of an example host system according to some implementations.

FIG. 7 is a block diagram of an example host system 200 according to some implementations. The host system 200 includes the port 202-1 (as well as other ports), where the port 202-1 is connected to the storage card 100. An interface circuit 702 is provided for the port 202-1. Communications between components of the host system 200 and the port 202-1 occur through the interface circuit 702, which can include buffers, amplifiers, and so forth.

The host system 200 also includes one or multiple processors 704, which can be coupled to a non-transitory computer-readable or machine-readable storage medium (or storage media) 706. A processor can include a microprocessor, microcontroller, physical processor module or subsystem, programmable integrated circuit, programmable gate array, or another physical control or computing device.

The storage medium (or storage media) 706 can store port configuration setup instructions 708, which are executable by the processor(s) 704. In some examples, the port configuration setup instructions 708 can be executed during a boot sequence of the host system 200 (when the host system 200 initially starts). The port configuration setup instructions 708 can present a user interface 710 on a display device 712 to a user, who is able to select a configuration of the port 202-1. For example, the user can specify that the port 202-1 is to be configured such that the communication medium 114 between the storage card 100 and the port 202-1 is split into multiple portions, such as according to FIG. 4 or FIG. 5. The configuration specified by the user can be used to configure the interface circuit 702, for example.

The storage medium (or storage media) 706 can also store storage access instructions 714 that are executable on the processor(s) 704. The storage access instructions 714 can access data on the storage card 100. The storage access instructions 714 are able to manage the storage data in the storage card 100 according to a RAID mode, in some examples. For example, the host system 200 can be a storage server in which the storage access instructions 714 are executable.

Figure 8:
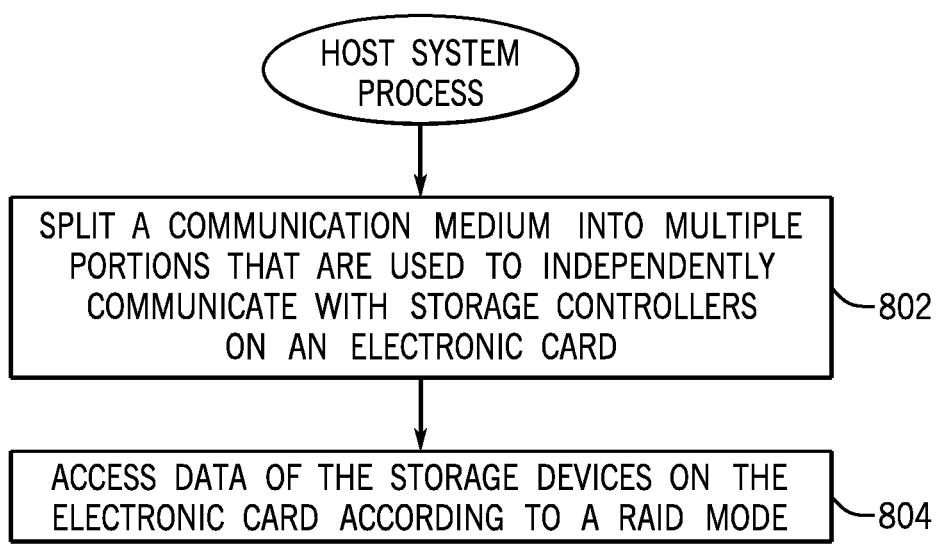
FIG. 8 is a flow diagram of a process according to some implementations.

FIG. 8 is a flow diagram of a process according to some implementations, which can be performed by the host system 200. The process performs configuration to split (at 802) a communication medium (e.g. communication medium 114) into multiple portions that are used to independently communicate with storage controllers (e.g. 104-1 and 104-2) on a support substrate (e.g. 108) of an electronic card (e.g. 100). The configuration can be performed using the port configuration setup instructions 708 of FIG. 7.

The process accesses (at 804) data of the storage devices (e.g. 106-1, 106-2) connected to the respective storage controllers in the electronic card according to a RAID mode. The access of data can be performed by the storage access instructions 714 of FIG. 7.

The storage medium (or storage media) 706 of FIG. 7 can be implemented with one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A single M.2 electronic card comprising:
a single support substrate;
a plurality of storage devices on the single support substrate;
a plurality of physically separate controllers on the single support substrate to manage access of the corresponding plurality of storage devices, wherein the plurality of controllers and the plurality of storage devices are arranged to store data according to a Redundant Array of Independent Disks (RAID) mode, wherein each of the plurality of physically separate controllers are coupled to a single corresponding storage device of the plurality of storage devices; and
a connector to a communication medium, split during a boot sequence into a plurality of distinct Peripheral Component Interconnect Express (PCIe) link portions, between the single electronic card and a port connector of a port of a host device to allow the plurality of controllers to independently communicate with the host device over a respective distinct PCIe link portion of the plurality of distinct PCIe link portions of the communication medium, wherein each of the plurality of controllers are designated to communicate over a corresponding distinct PCIe link portion of the communication medium and restricted from communicating over other physically distinct PCIe link portions of the communication medium, wherein the plurality of distinct PCIe link portions of the communication medium include:
a first distinct PCIe link portion that corresponds to a first controller of the plurality of controllers on the single support substrate; and
a second distinct PCIe link portion that corresponds to a second controller of the plurality of controllers on the single support substrate.

2. The single M.2 electronic card of claim 1, wherein the second distinct PCIe link portion is exclusively utilized by the second controller and the first distinct PCIe link portion is exclusively utilized by the first controller.

3. The single M.2 electronic card of claim 1, wherein the plurality of distinct PCIe link portions of the communication medium are physically distinct PCIe link portions, each of the physically distinct PCIe link portions having a bandwidth less than a full bandwidth of the communication medium, and wherein the plurality of controllers are to concurrently communicate over the physically distinct PCIe link portions of the communication medium.

4. The single M.2 electronic card of claim 1, wherein the RAID mode stripes data across the plurality of storage devices.

5. The single M.2 electronic card of claim 1, wherein the RAID mode provides redundant data.

6. The single M.2 electronic card of claim 1, wherein the RAID mode both provides redundant data and stripes data across the plurality of storage devices.

7. The single electronic card of claim 1, wherein the electronic card is a peripheral card directly coupled to the host device.

8. The single electronic card of claim 1, wherein the connector includes signal pins that communicate respective signals over the communication medium to the host device.

9. The single electronic card of claim 1, wherein the connector includes power pins to deliver a power supply voltage from the host device to the electronic card.

10. A method comprising:
communicating, through a M.2 standard connector directly coupled to a port connector of a port of a host device over respective distinct portions of a communication medium, by storage controllers with the host device, the storage controllers on a single support substrate of an single M.2 card, wherein storage devices are further on the single support substrate, wherein the storage controllers communicate independently over the respective distinct portions with the host device that are designated during a boot sequence to each of the storage controllers and restricted from communicating with the host device over other distinct portions of the communication medium; wherein each of the storage controllers are coupled to a single corresponding storage device, and wherein the respective distinct portions of the communication medium include:
a first distinct link portion that corresponds to a first controller of the controllers on the single support substrate; and
a second distinct link portion that corresponds to a second controller of the controllers on the single support substrate; and
managing, by the storage controllers, access of the corresponding storage devices according to a Redundant Array of Independent Disks (RAID) mode.

11. The method of claim 10, wherein the communication medium includes a Peripheral Component Interconnect Express (PCIe) link.

12. The method of claim 10, wherein the storage controllers communicate concurrently over the respective designated portions of the communication medium with the host device.

13. An article comprising at least one machine-readable storage medium storing instructions that upon execution cause a system to:
split, during a boot sequence, a communication medium into a plurality of distinct portions that are used to independently communicate with a plurality of storage controllers on a single support substrate of an single M.2 Peripheral Component Interconnect Express (PCIe) card, wherein the plurality of distinct portions allow the plurality of storage controllers to independently communicate with a port connector of a port of a host device over a respective distinct portion of the plurality of portions of the communication medium that is designated to each of the plurality of controllers respectively and restricted from communicating with the host device over other distinct portions of the communication medium, wherein each of the plurality of controllers are coupled to a single corresponding storage device of the plurality of storage devices, and wherein the plurality of distinct portions of the communication medium include:
  a first distinct link portion that corresponds to a first controller of the plurality of controllers on the single support substrate; and
  a second distinct link portion that corresponds to a second controller of the plurality of controllers on the single support substrate; and
access data of storage devices connected to the respective storage controllers of the single M.2 PCIe card according to a Redundant Array of Independent Disks (RAID) mode, wherein the storage devices are solid state storage devices or disk-based storage devices.

14. The article of claim 13, wherein the splitting comprises dividing a PCIe link into a plurality of links to allow for independent communications over the respective plurality of links to the storage controllers of the single PCIe card.

* * * * *